Figure 1:
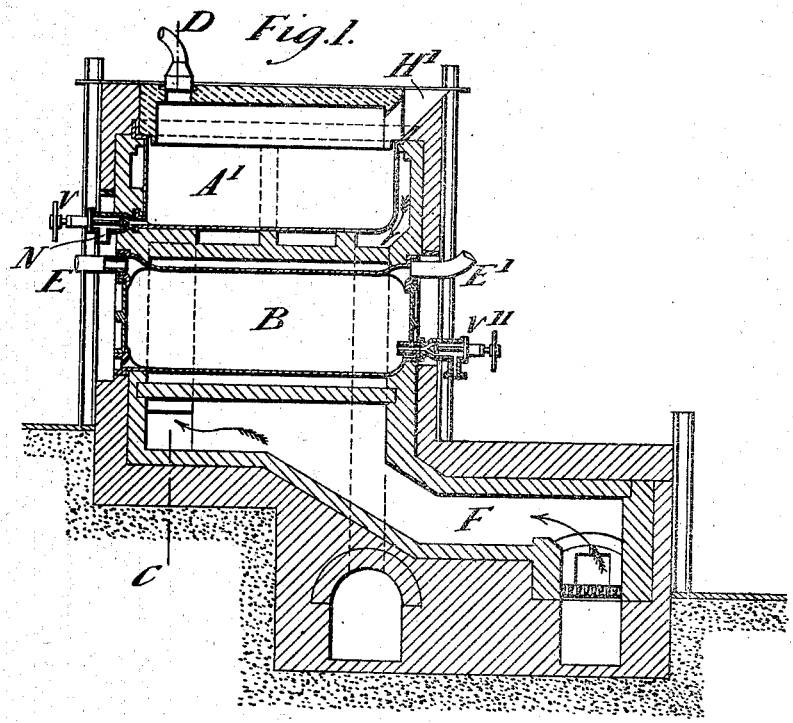

No. 681,085.  
C. UEBEL.  
METHOD OF MAKING NITRIC ACID.  
(Application filed Mar. 5, 1901.)  
Patented Aug. 20, 1901.

(No Model.) 2 Sheets—Sheet 1.

Witnesses.

Inventor:
Carl Uebel,
By James L. Norris
Att'y.

No. 681,085. Patented Aug. 20, 1901.
C. UEBEL.
METHOD OF MAKING NITRIC ACID.
(Application filed Mar. 5, 1901.)
(No Model.) 2 Sheets—Sheet 2.
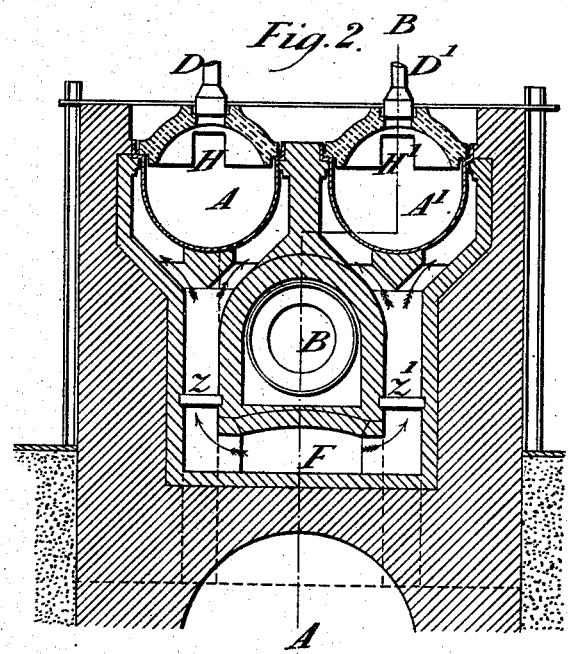
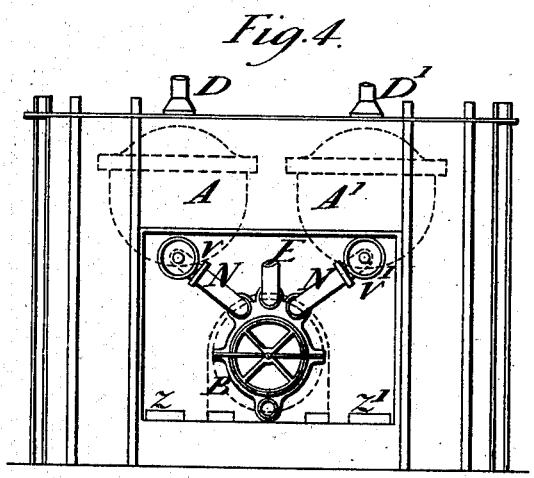
Witnesses.
Inventor.
Carl Uebel.
By James L. Norris
Atty.

UNITED STATES PATENT OFFICE.

CARL UEBEL, OF AACHEN, GERMANY, ASSIGNOR TO CHEMISCHE FABRIK RHENANIA, OF SAME PLACE.

METHOD OF MAKING NITRIC ACID.

SPECIFICATION forming part of Letters Patent No. 681,085, dated August 20, 1901.

Application filed March 5, 1901. Serial No. 49,966. (No specimens.)

*To all whom it may concern:*

Be it known that I, CARL UEBEL, a citizen of Germany, residing at Aachen, in the Empire of Germany, have invented a certain new and useful Process for the Manufacture of Nitric Acid, (for which application for a patent has been made in Great Britain, No. 3,305, dated February 15, 1901, and in Germany, dated March 10, 1900,) of which the following is a specification.

Nitric acid is generally made by heating a nitrate with sulfuric acid in a retort and collecting the distillate. The temperature of the mixture is slowly raised to 300° centigrade, and when the nitric acid has all been distilled the fire is drawn, the hot bisulfate is run out of the retort, and the latter is allowed to cool for some hours before it is recharged. Thus the consumption of fuel is high. Moreover, the distillate which is concentrated at the beginning of the operation becomes weaker toward the end, when much water is expelled with the last portion of nitric acid. At this period there is much frothing, so that the retort must be cautiously heated. In the process as commonly conducted, therefore, a continuous manufacture of nitric acid is very difficult.

The present invention relates to a process for the continuous manufacture of nitric acid in which concentrated acid and dilute acid are distilled from the same charge, but in different retorts. In this manner the change of receivers necessary when the whole distillation is conducted in one retort and concentrated acid is required is avoided, and at the same time there is a considerable saving of fuel.

The invention is based on the observations, first, that the distillation of concentrated acid from a charge occupies more time than the subsequent distillation of the dilute acid, and, second, that the distillation of the dilute acid can be hastened and accomplished without the usual frothing if the charge remaining after the concentrated acid has been distilled is run into hot bisulfate.

The process consists, therefore, in charging nitrate and sulfuric acid or polysulfate into two or more retorts worked successively and distilling concentrated nitric acid therefrom. When this stage of the operation is complete, the residual charge is transferred to another retort common to all the first-mentioned retorts and containing hot bisulfate, by means of which the dilute nitric acid is distilled. The number of first-named retorts which can be served by one retort containing bisulfate depends, of course, on the relative size of the latter. For the sake of example the process will be described with reference to only three retorts and to an advantageous installation. The latter is shown in the accompanying drawings, in which—

Figure 3:
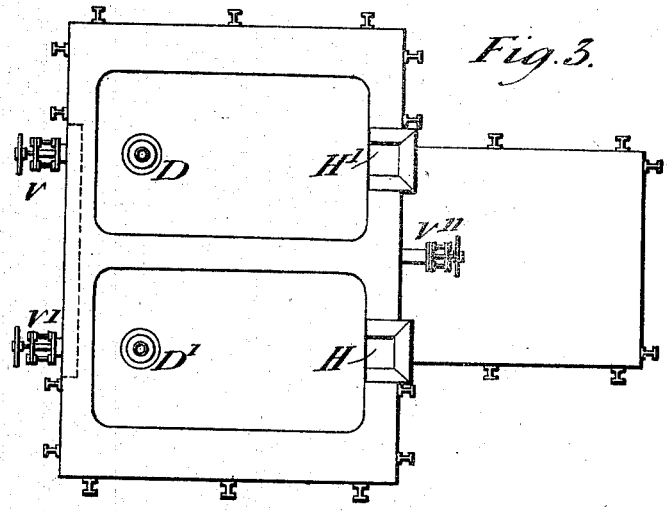

Figure 1 is a vertical longitudinal section on line A B of Fig. 2, which is a section on line C D of Fig. 1. Fig. 3 is a plan, and Fig. 4 is a back view.

A A' are the retorts for distilling the concentrated acid provided with charging-openings H H' and pipes D D' for escape of acid-vapor. As the temperature they require is comparatively low—namely, about 170° to 180° centigrade—they are set in branch flues of a furnace F, in the main flue of which is set the bisulfate-retort B, which is heated to about 300° centigrade. By setting retorts A A' above retort B the residual charge can be run by gravity from either of the upper retorts into the lower one through a pipe N, controlled by a valve $v\ v'$. The temperature of the upper retorts is controlled by dampers $z\ z'$, respectively.

E E' are pipes providing for escape of vapor from the lower retort B, and $v^2$ is a valve for withdrawing the molten bisulfate.

The process is conducted in this apparatus as follows: The fire having been lighted, one of the upper retorts—say A—receives through opening H a charge of saltpeter and sulfuric acid or fused polysulfate. The damper $z$ is now opened and the retort heated until the desired proportion of the nitric acid has distilled over. The contents of A are now allowed to flow slowly through valve $v$ into the lower retort B, which always contains a quantity of bisulfate at a temperature of about 300° centigrade, the valve $v^2$ being at such a height above the bottom of the retort that the contents of the latter can never be completely withdrawn. In this lower retort the nitric acid is completely expelled, and meanwhile the second upper retort A' is being charged and heated, so that there is another charge ready for B when its first one has been worked off. These operations are repeated to obtain a constant distillation of acid.

I am aware that it has been proposed to distil nitric acid by charging nitrate into hot polysulfate; but a continuous distillation of acid is not possible by this process, and I make no claim thereto.

Having thus described my invention, what I claim as new, and desire to secure by Letters Patent, is—

A process of making nitric acid, consisting in partly decomposing a nitrate and sulfuric acid at a suitable temperature, and then subjecting the partly-decomposed mixture to bisulfate of a greater temperature than that employed for the first reaction.

In testimony whereof I have hereunto set my hand in presence of two subscribing witnesses.

CARL UEBEL.

Witnesses:
  H. QUADFLIEZ,
  HÙR PÖPING.